United States Patent
Bolha et al.

(10) Patent No.: US 12,536,492 B2
(45) Date of Patent: Jan. 27, 2026

(54) SYSTEMS AND METHODS FOR ITEM TRACKING AND DELIVERY

(71) Applicant: United States Postal Service, Washington, DC (US)

(72) Inventors: Rosemarie Bolha, Washington, DC (US); Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 855 days.

(21) Appl. No.: 16/418,671

(22) Filed: May 21, 2019

(65) Prior Publication Data

US 2019/0362311 A1 Nov. 28, 2019

Related U.S. Application Data

(60) Provisional application No. 62/674,996, filed on May 22, 2018.

(51) Int. Cl.

| | |
|---|---|
| *G06Q 10/083* | (2024.01) |
| *G06F 16/29* | (2019.01) |
| *G06Q 10/0631* | (2023.01) |
| *G06Q 10/0835* | (2023.01) |
| *H04W 4/02* | (2018.01) |
| *H04W 4/029* | (2018.01) |

(52) U.S. Cl.
CPC ....... *G06Q 10/08355* (2013.01); *G06F 16/29* (2019.01); *G06Q 10/063116* (2013.01); *G06Q 10/06315* (2013.01); *H04W 4/025* (2013.01); *H04W 4/029* (2018.02)

(58) Field of Classification Search
CPC ..... G06Q 10/08355; G06Q 10/063116; G06Q 10/06315; G06Q 10/06314; G06Q 10/08; G06Q 10/083; H04W 4/029; H04W 4/025; G06F 16/29; G05D 1/0088
USPC ............................................... 705/7.13, 2, 13
See application file for complete search history.

(56) References Cited

U.S. PATENT DOCUMENTS

| | | | | |
|---|---|---|---|---|
| 8,078,485 | B1 * | 12/2011 | Kraehmueller | .... G06Q 30/0201 705/7.29 |
| 8,339,251 | B2 * | 12/2012 | Roberts, Sr. | ............ G06F 17/00 701/32.1 |
| 9,336,510 | B2 | 5/2016 | Dearing et al. | |
| 10,496,095 | B1 * | 12/2019 | Bays | ..................... B64C 39/024 |
| 10,628,794 | B2 | 4/2020 | Dearing et al. | |
| 12,367,451 | B2 * | 7/2025 | Turner | ............ G06Q 10/08355 |
| 2003/0192947 | A1 | 10/2003 | Toedtli | |

(Continued)

OTHER PUBLICATIONS

USPS, Appendix F Glossary, Feb. 25, 2013, https://web.archive.org/web/20130225123228/https://about.usps.com/publications/pub804/pub804_f.htm (Year: 2013).

*Primary Examiner* — Rutao Wu
*Assistant Examiner* — Stephen S Swartz
(74) *Attorney, Agent, or Firm* — Knobbe, Martens, Olson & Bear, LLP

(57) ABSTRACT

A system and method for tracking the progress of item delivery delivering items. In some embodiments, item delivery can use a mobile device to track the location, current route, and cargo for a vehicle they are using to deliver items. A central server can receive this information and determine a docking and staffing plan for an item delivery facility based on the information.

15 Claims, 9 Drawing Sheets

(56) References Cited

U.S. PATENT DOCUMENTS

| | | | |
|---|---|---|---|
| 2004/0193502 A1* | 9/2004 | Heitner | G06Q 10/08 |
| | | | 705/28 |
| 2009/0228155 A1* | 9/2009 | Slifkin | B60H 1/3232 |
| | | | 700/299 |
| 2010/0030667 A1 | 2/2010 | Chudy et al. | |
| 2011/0046775 A1* | 2/2011 | Bailey | G06Q 50/28 |
| | | | 700/224 |
| 2012/0203398 A1* | 8/2012 | Roberts, Sr. | G06F 17/00 |
| | | | 701/1 |
| 2012/0246039 A1* | 9/2012 | Fain | G06Q 40/125 |
| | | | 705/341 |
| 2012/0265585 A1* | 10/2012 | Muirbrook | G07B 15/02 |
| | | | 705/13 |
| 2013/0085668 A1* | 4/2013 | Roberts, Sr. | G08G 1/20 |
| | | | 701/465 |
| 2014/0087772 A1 | 3/2014 | Papa et al. | |
| 2014/0171013 A1* | 6/2014 | Varoglu | H04W 4/021 |
| | | | 455/456.6 |
| 2014/0262690 A1 | 9/2014 | Henderson et al. | |
| 2017/0270448 A1* | 9/2017 | Kao | G06Q 10/06314 |
| 2017/0303082 A1* | 10/2017 | Jones | H04L 67/52 |
| 2018/0121864 A1* | 5/2018 | Sullivan | G06Q 10/06316 |
| 2018/0158020 A1* | 6/2018 | Khasis | G01C 21/343 |
| 2018/0341904 A1* | 11/2018 | Aleman | G06Q 50/28 |
| 2019/0095859 A1* | 3/2019 | Pike | G06Q 10/0834 |
| 2019/0152376 A1 | 5/2019 | Schwartz et al. | |
| 2019/0168392 A1 | 6/2019 | Väin et al. | |
| 2020/0005240 A1 | 1/2020 | Ko et al. | |
| 2023/0342874 A1* | 10/2023 | Lu | G06Q 50/40 |

\* cited by examiner

SYSTEMS AND METHODS FOR ITEM TRACKING AND DELIVERY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/674,996, filed May 22, 2018, the entire contents of which are hereby incorporated by reference.

BACKGROUND

The development relates to systems and methods using a mobile device for coordinating and tracking item deliver. In some embodiments, items can be envelopes, packages, parcels, suitcases, or other objects that can be delivered. In some embodiments, item delivery can transport items from a pick up location to a mail delivery center, where they can be distributed. In some embodiments, it can be advantageous for the mail delivery center to track the progress and contents that the delivery resource is transporting to the mail delivery center.

SUMMARY

In some embodiments, the invention comprises a server comprising a location database configured to receive location data associated with at least one vehicle or vehicle trailer; a docking database configured to develop a docking plan based at least in part on the location data associated with the at least one vehicle or vehicle trailer and to determine a docking assignment for the at least one vehicle or vehicle trailer based at least in part on the docking plan; and a communication module configured to communicated the docking plan to a mobile device associated with the vehicle or vehicle trailer.

In some embodiments the invention can further comprise a route database configured to store a route associated with the at least one vehicle or vehicle trailer. In some embodiments, the location database is configured to determine an expected arrival time of the at least one vehicle or vehicle trailer based at least in part on the route associated with the at least one vehicle or vehicle trailer and the location data associated with the at least one vehicle. In some embodiments, the docking database is configured to determine the docking plan based at least in part on the expected arrival time of the at least one vehicle of vehicle trailer.

In some embodiments, the server further comprises a geofence database configured to identify the position of at least on vehicle or vehicle trailer within an item delivery facility based at least in part on the location data. In some embodiments, the docking database is configured to determine the docking plan based at least in part on the position of at least on vehicle or vehicle trailer within an item delivery facility.

In some embodiments, the server further comprises a staffing database configured to determine a staffing plan based at least in part on the location data of the at least one vehicle or vehicle trailer.

In some embodiments, the location database is configured to receive the location data from a mobile device.

In some embodiments, the communication module is further configured to receive a cargo manifest from a mobile device. In some embodiments, the cargo manifest is generated by the mobile device based at least on scan information associated with at least on item or item container.

In some embodiments, the invention comprises a method comprising receiving location data associated with at least one vehicle or vehicle trailer; developing a docking plan based at least in part on the location data associated with the at least one vehicle or vehicle trailer and to determine a docking assignment for the at least one vehicle or vehicle trailer based at least in part on the docking plan; and communicating the docking plan to a mobile device associated with the vehicle or vehicle trailer.

In some embodiments, the method further comprises storing a route associated with the at least one vehicle or vehicle trailer. The method can further comprise determining an expected arrival time of the at least one vehicle or vehicle trailer based at least in part on the route associated with the at least one vehicle or vehicle trailer and the location data associated with the at least one vehicle. The method can further comprise determining the docking plan based at least in part on the expected arrival time of the at least one vehicle of vehicle trailer.

In some embodiments, the method further comprises identifying the position of at least on vehicle or vehicle trailer within an item delivery facility based at least in part on the location data. In some embodiments, the method further comprises determining the docking plan based at least in part on the position of at least on vehicle or vehicle trailer within an item delivery facility.

In some embodiments, the method further comprises determining a staffing plan based at least in part on the location data of the at least one vehicle or vehicle trailer.

In some embodiments, the method further comprises receiving the location data from a mobile device. In some embodiments, the method further comprises receiving a cargo manifest from a mobile device. In some embodiments, the cargo manifest is generated by the mobile device based at least on scan information associated with at least on item or item container.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

Some embodiments of a system and method for the creation of relationships between delivery objects and item delivery are described herein. In some embodiments, the relationships can designate that one delivery object is contained within another delivery object and that one or both of the delivery objects are associated with a particular mobile computing device.

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

As used herein, the term delivery resource may refer to a carrier or driver individual assigned to a route or a route leg who delivers the items to a destination. Delivery resource may also refer to vehicles, such as trucks, trains, planes, cars, vans; rolling stock; robotic or automated vehicles; and other components of the distribution network. The present disclosure also relates to systems and methods to dynamically alter routes during the delivery process based on a change in items for delivery or pick-up in a geographic area.

Figure 1:
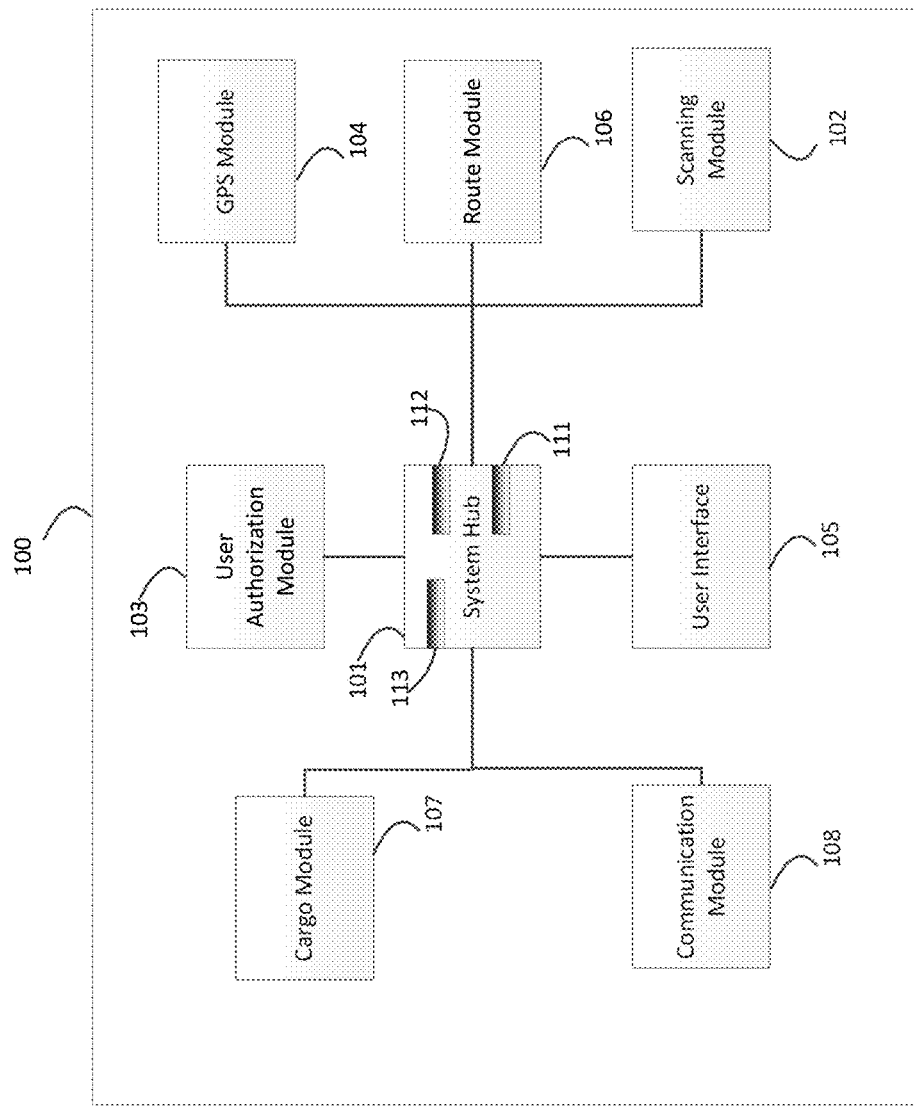
FIG. 1 is a block diagram displaying one embodiment of a mobile device for tracking item delivery.

The system and method described herein relate to generating and communicating delivery object associations and ownership data. FIG. 1 depicts an embodiment of mobile device 100 for tracking the progress of item delivery. The mobile device 100 comprises a system hub 101, scanning module 102, user authorization module 103, GPS module 104, route module 106, cargo module 107, communication module 108 and user interface 105. The system hub 101 is in communication, either wired or wirelessly, with at least scanning module 102, user authorization module 103, GPS module 104, route module 105, cargo module 106, communication module 107 and user interface 108. The mobile device 100 can be a specialized mobile computing device provided by the distribution entity, such as the United States Postal Service (USPS). In some embodiments, the mobile device 100 can be a mobile computing device provided by a delivery resource, a contract carrier, or other entity, where the functionality described herein is obtained by an application running on that mobile computing device. In some embodiments, the delivery resource may use a smartphone having a specific application thereon which enables the smartphone to access the various modules and database described herein, or provides the functionality of the modules and databased described herein.

The system hub 101 may comprise or be a component of a processing system implemented with one or more processors. The system hub 101 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 101 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the mobile device 100, and controlling access to and from, and transmitting information and data to and from the system hub 101 and the constituent components of the mobile device 100, as will be described herein.

The system hub 101 comprises a system memory 113 configured to store information, such as the location, cargo, and route of the delivery resource. The system memory 113 may comprise a database on the same or separate system, a comma delimited file, a text file, or the like. The system hub 101 is configured to coordinate and direct the activities of the components of the mobile device 100, and to coordinate tracking the progress of an item or of the mobile device 100.

The system hub 101 is in communication with scanning module 102. In some embodiments, the scanning module 102 may comprise a processor, memory, databases, address and control lines, and other components similar to those described herein for the system hub 101. In other embodiments, the scanning module 102 may be configured to use the processor, memory, databases, address and control lines, and other components of system hub 101, or a combination of its own components and the system hub 101's components.

The scanning module 102 can be used to scan things for use by the mobile device in the tracking of an delivery resource. In some embodiments, scanning module 102 can be a camera, a QR code scanner, or barcode scanner or the like. In some embodiments, the scanning module 102 can be used to scan a barcode, QR code or other computer readable code. In some embodiments, the scanning module 102 can scan the barcode, QR code, or other computer readable code, and identify a unique identifier encoded within or associated with the computer readable code that identifies an item of interest of the mobile device. In some embodiments, the item of interest can be an identification badge worn by or associated with a delivery resource, a computer readable code on a vehicle that is placed on the vehicle, and a computer readable code that identifies a container of items to be delivered and that is place in the container. In some embodiments, the mobile device has additional information about the delivery object stored in memory and which is associated with the unique identifier. As discussed above, in some embodiments the memory could be database in the same or separate system or memory in a separate system.

The system hub 101 is in communication with user authorization module 103. In some embodiments, the scanning module 102 may comprise a processor, memory, databases, address and control lines, and other components similar to those described herein for the system hub 101. In other embodiments, the user authorization module 103 may be configured to use the processor, memory, databases, address and control lines, and other components of system hub 101, or a combination of its own components and the system hub 101's components.

The user authorization module 103 is responsible for ensuring that a user is authorized to use the mobile device 100. In some embodiments, user authorization module 103 can confirm that a user is authorized by receiving a unique identifier from a user such as a user name and password, or by scanning an employee badge displaying a computer readable code. The user authorization module 103 can then send this unique identifier to a central server, which confirms that the user is authorized to use the system. In some embodiments, the list of identifiers that are authorized to use the device is instead stored directly in the mobile device 100 in user authorization module 103.

The system hub 101 is also in communication with GPS module 104. In some embodiments, the GPS module 104 may comprise a processor, memory, databases, address and control lines, and other components similar to those described herein for the system hub 101. In other embodiments, the GPS module 104 may be configured to use the processor, memory, databases, address and control lines, and other components of system hub 101, or a combination of its own components and the system hub 101's components.

The GPS module 104 is in communication with GPS satellites and can discover the specific location of the mobile device 100 through its communications with the GPS satellites. In some embodiments, the GPS module 110 uses other position determining systems to determine the mobile device 100's exact location, such as GLONASS, COMPASS, multilateration, Wi-Fi detection, triangulation, or LORAN. In some embodiments, the GPS module 110 records the mobile device 100's location periodically, such as at a defined time interval, in order to generate "breadcrumb" data. In some embodiments, the GPS module 110 records the geographic coordinates of the mobile device 100 every second. In some embodiments, the communication module 170 communicates the geographic coordinates of the mobile device 100 once per minute, once every other minute, once a day, at any other time interval, or continuously. In some embodiments, the GPS module 102 also records the exact time that it determined the mobile device 100's location. In some embodiments, the GPS module 100 can also associate the unique identifier that was used to log into the system with user authorization module 103 with the data it is collecting.

In some embodiments, system hub 101 is in communication with user interface 105. In some embodiments, the user interface 105 may comprise a processor, memory, databases, address and control lines, and other components similar to those described herein for the system hub 101. In other embodiments, the user interface 105 may be configured to use the processor, memory, databases, address and control lines, and other components of system hub 101, or a combination of its own components and the system hub 101's components.

In some embodiments, the user interface 105 can be used by the operator of the mobile device 100 to control its various functions. In some embodiments, the user interface can comprise virtual buttons or softkeys that are manipulated via a touch screen, mouse, keyboard, or other input device. In some embodiments, the user interface 105 can be used by the user to manually enter a unique identifier for a delivery object instead of scanning a delivery object. In some embodiments, user interface 105 can also comprise a display screen and/or audio speaker to transmit information to the user.

System hub 101 can also be in communication with route module 106. In some embodiments, the route module 106 may comprise a processor, memory, databases, address and control lines, and other components similar to those described herein for the system hub 101. In other embodiments, the route module 106 may be configured to use the processor, memory, databases, address and control lines, and other components of system hub 101, or a combination of its own components and the system hub 101's components.

The route module 106 can be used to identify the current delivery route that an delivery resource is assigned to, intends to travel on, or is currently traveling on. In some embodiments, the delivery route can be the route that the delivery resource will travel along to transfer items from a pickup location where items are picked up by the delivery resource to a distribution network facility. In some embodiments, the route can also comprise additional stops where additional items may be picked up or dropped off. In some embodiments, routes can also be classified into two categories, long-haul and local trips. In some embodiments, local trips are day routes that will last only for a single day, while long-haul routes can last multiple days. In some embodiments, routes can be further divided into trip legs, which represent subdivisions of a route between inter route pick up and drop off points.

In some embodiments, the route module 106 can identify the route the delivery resource intends to travel on or is currently traveling on by receiving a unique route ID. In some embodiments, the route module 106 contains a database of potential routes identified via unique IDs. In some embodiments, the route module 106 receives the potential routes from a central server 200, as discussed further below. In some embodiments, the delivery resource can enter the route ID into the mobile device 100 using user interface 108. In some embodiments, the delivery resource can also search for routes using mobile device 100. In some embodiments, the delivery resource can specifically search for local routes or longhaul routes. In some embodiments on a search the route module 106 will return all routes that are scheduled to begin within a four hour window of the current time for local searches, and will return all routes that begin within a 5 day window of the current time for longhaul searches. It is to be understood that these time windows are merely exemplary time windows and that any time windows could be used. In some embodiments, the route database 105 can also only return routes that begin within a certain distance of the current location of the mobile device 100 as determined by the GPS module 104.

In some embodiments, the route module 106 can also be used to determine what trip leg of a route the delivery resource will use. In some embodiment, the mobile device will display every trip leg associated with a route to the user based on the information about the trip legs stored in route module 106. The user then can select the trip leg the user intends to travel on next.

In some embodiments, when the user has selected a route or trip leg with route module 106, route module 106 can send the selection to a central server as described further below.

The system hub 101 is in communication with cargo module 107. In some embodiments, the cargo module 107 may comprise a processor, memory, databases, address and control lines, and other components similar to those described herein for the system hub 101. In other embodiments, the cargo module 107 may be configured to use the processor, memory, databases, address and control lines, and other components of system hub 101, or a combination of its own components and the components of the system hub 101.

The cargo module 107 can be used by the operator of mobile device 100 designate what items or item containers that the delivery resource is currently carrying. In some embodiments, the cargo module 107 can add a list of items or item containers scanned by scanning module 102 to a manifest that designates what the delivery resource is currently carrying. In some embodiments, the cargo module 107 can similarly remove a list of scanned items from a manifest in order to show what items are unloaded. In some embodiments, the cargo module 107 can also record the location where an item or item container is scanned as part of the loading and unloading process. In some embodiments, the delivery resource can also scan a unique identifier on a vehicle to designate that this is the vehicle that the delivery resource be assigned to or associated with.

In some embodiments, the cargo module 107 can receive information on which items and item containers item delivery are carrying from a separate system. In some embodiments, the cargo module 107 can also determine the destination of the item or item container based on the scan of the item or item container.

In some embodiments, system hub 101 is in communication with communication module 108. In some embodiments, the communication module 105 may comprise a processor, memory, databases, address and control lines, and other components similar to those described herein for the system hub 101. In other embodiments, the communication module 108 may be configured to use the processor, memory, databases, address and control lines, and other components of system hub 101, or a combination of its own components and the system hub 101's components.

In some embodiments, communication module 108 is responsible for communications between the mobile device 100 and other devices via wired and/or wireless communication. In some embodiments, the communication module 108 communicates via telephone, cable, fiber-optic, or any other wired communication network. In some embodiments, the communication module 108 may communicate via cellular networks, WLAN networks, or any other wireless network. In some embodiments, the communication module 108 can be used to communicate any of the data collected by mobile device 100 or any data that needs to be transmitted to mobile device 100. In some embodiments, the communication module 108 can transmit all the information to and from a central server.

Figure 2:
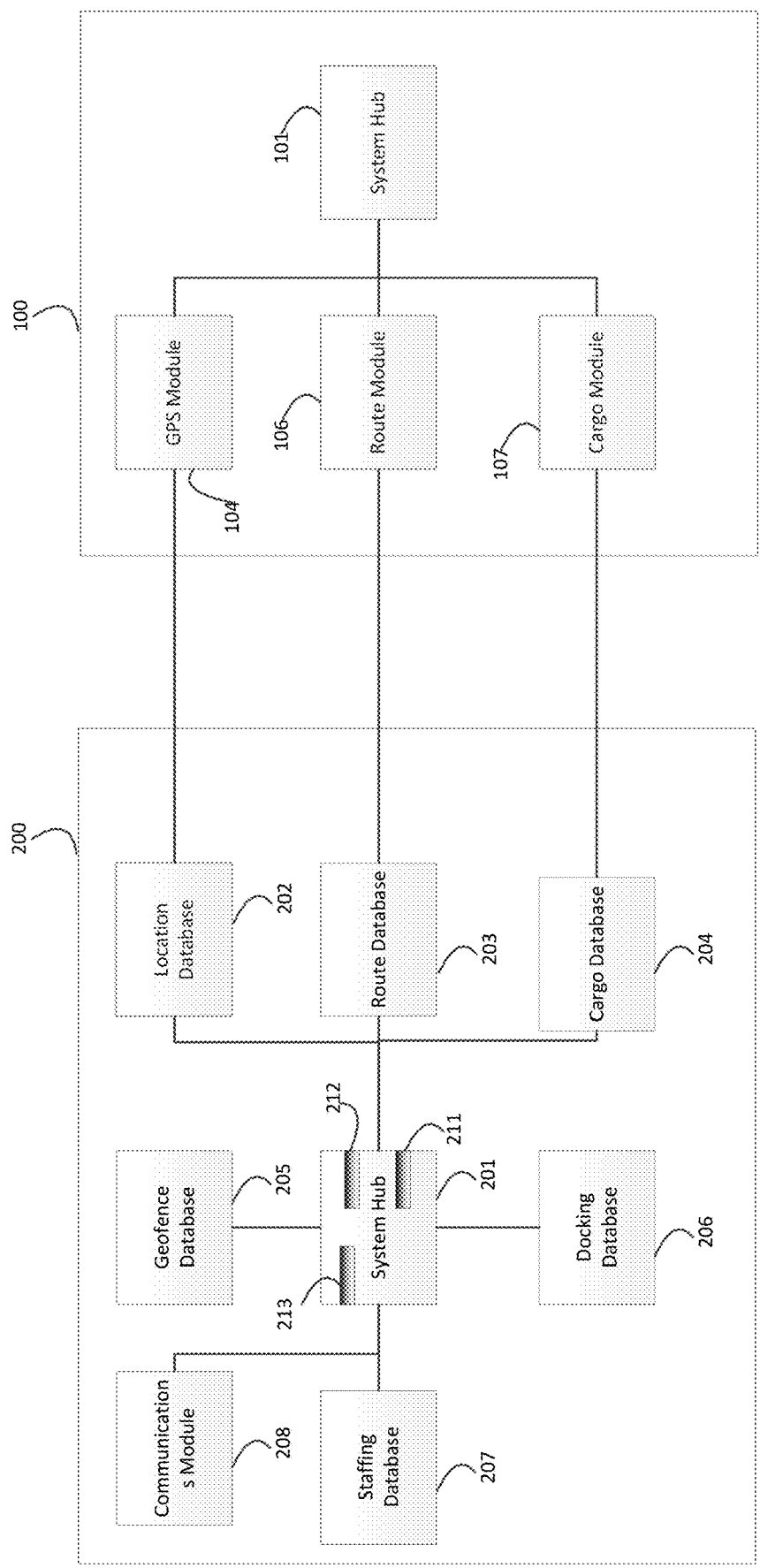
FIG. 2 is block diagram displaying one embodiment of a system for tracking item delivery.

FIG. 2 is block diagram displaying one embodiment of a system for using the mobile device for tracking an item's progress. In some embodiments, a central server 200 can be in communication with multiple mobile devices 100. In some embodiments, central server 200 can receive information such as mobile device location information, route information and cargo information from the mobile device 100. This information can then be accessed by other systems that need information about the item delivery. In some embodiments, central server 200 can comprise a server system hub 201 in communication with a location database 202, a route database 203, a cargo database 204, geofence database 205, docking database 206, staffing database 207, and communications module 208.

The server system hub 201 may comprise or be a component of a processing system implemented with one or more processors. The server system hub 201 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The server system hub 201 may comprise a processor 211 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 211 typically has conventional address lines, conventional data lines, and one or more conventional control lines. The processor 211 may be in communication with a processor memory 212, which may include, for example, RAM memory, flash memory, ROM memory, EPROM memory, EEPROM memory, registers, hard disk, a removable disk, a CD-ROM, or any other form of storage medium known in the art. The processor memory 212 may include, for example, software, at least one software module, instructions, steps of an algorithm, or any other information. In some embodiments, the processor 211 performs processes in accordance with instructions stored in the processor memory 212. These processes may include, for example, controlling features and/or components of the expected delivery window generation system 100, and controlling access to and from, and transmitting information and data to and from the server system hub 201 and the constituent components of the mobile device 100, as will be described herein.

The server system hub 201 comprises a system memory 213, configured to store information, such as routes, location data, cargo data and the like. The system memory 213 may comprise a database, a comma delimited file, a text file, or the like. The server system hub 201 is configured to coordinate and direct the activities of the components of the central server 200.

System hub 201 is in communication with location database 202. In some embodiments, the location database 202 may comprise a processor, memory, databases, address and control lines, and other components similar to those described herein for the system hub 201. In other embodiments, the location database 202 may be configured to use the processor, memory, databases, address and control lines, and other components of system hub 201, or a combination of its own components and the system hub 201's components.

The location database 202 can be responsible for tracking the location of items. In some embodiments, the location database 202 can track the location of the mobile device 100 by receiving location data from the GPS module 104 of mobile device 100. In some embodiments, the location database 202 can track the location of items and the mobile device 100 by periodically receiving the GPS coordinates of the mobile device 100 along with the unique identifier associated with the delivery resource and/or the mobile device 100, and the time the location was recorded. In some embodiments, the location database 202 can use this data to estimate the arrival time of an delivery resource to a particular location along a route. In some embodiments, the location database 202 can store the data received from multiple mobile devices 100 associated with multiple item delivery. By tracking the mobile device 100, the system hub 201 can determine which vehicle, container, etc. is associated with or assigned to the mobile device 100. The system hub 201 can then obtain item information for the items assigned to or associated with the items on the vehicle, in the container, etc. In this way, all the items on the vehicle, in the container, with the delivery resource, etc., can be tracked based on the location of the mobile device 100 assigned to the delivery resource and the vehicle.

System hub 201 is also in communication with route database 203. In some embodiments, the route database 203 may comprise a processor, memory, databases, address and control lines, and other components similar to those described herein for the system hub 201. In other embodiments, the route database 203 may be configured to use the processor, memory, databases, address and control lines, and other components of system hub 201, or a combination of its own components and the system hub 201's components.

Route database 203 can be configured to store all the potential delivery routes that item delivery will use to deliver items and to transmit those routes to route module 105. In some embodiments, the routes can be determined by a user of the central system 200 and entered into the database. In some embodiments, this user is an delivery resource supervisor who can determine delivery routes. In some embodiments, the routes are automatically determined by the route database 203 based on the location of various items for delivery. In some embodiments, route database 203 can also receive route selections back from route module 106 and store what vehicles are currently driving what routes based on the received information System hub 201 is also in communication with cargo database 203. In some embodiments, the cargo database 203 may comprise a processor, memory, databases, address and control lines, and other components similar to those described herein for the system hub 201. In other embodiments, the cargo database 203 may be configured to use the processor, memory, databases, address and control lines, and other components of system hub 201, or a combination of its own components and the system hub 201's components.

Cargo database 204 can store the cargo manifests of the various delivery resources, including vehicles, that are used for item delivery. In some embodiments, the cargo database 204 receives this information from cargo module 106 as items and item containers are loaded and unloaded from vehicles. In some embodiments, the cargo database 204 can also receive this information from other systems.

System hub 201 is also in communication with geofence database 205. In some embodiments, the geofence database 205 may comprise a processor, memory, databases, address and control lines, and other components similar to those described herein for the system hub 201. In other embodiments, the geofence database 205 may be configured to use the processor, memory, databases, address and control lines, and other components of system hub 201, or a combination of its own components and the system hub 201's components.

The geofence database 205 can store information on geofences related to or associated with locations within the distribution network. In some embodiments, a geofence is a defined set of geographic coordinates surrounding a particular geographic coordinate point. For example, a geofence can be a five meter circle surrounding the center of a particular house, or it can be a set of points designating a certain portion of an distribution facility as a parking lot, dock, or loading zone. In some embodiments, the geofence database 205 can use the stored geofences to determine when an delivery resource, a mobile device 100, item, or delivery object has entered into a particular distribution facility or a particular portion of an distribution facility based on comparing the geofence to the location of the mobile device 100. In some embodiments, the geofence database 205 can determine when the delivery resource has entered an item facility and also can determine where a particular delivery resource is located within a facility, such as at a particular docking area. In some embodiments, the geofence database 205 can store geofences corresponding to every docking station at the various item delivery facilities.

In some embodiments, the geofence database 205 can inform the docking database 206 where all the vehicles have been docked.

System hub 201 is also in communication with docking database 206. In some embodiments, the docking database 206 may comprise a processor, memory, databases, address and control lines, and other components similar to those described herein for the system hub 201. In other embodiments, the docking database 206 may be configured to use the processor, memory, databases, address and control lines, and other components of system hub 201, or a combination of its own components and the system hub 201's components.

Docking database 206 can store information regarding the various docking stations for loading and unloading items at various item delivery facilities. In some embodiments, the docking database 206 can store information about each docking station like what kinds of vehicles can fit at the docking station, whether the docking station is currently occupied, forecast when it will be empty, what is intended to dock in the future, and the like. In some embodiments, the docking database 206 can determine whether a docking station is currently occupied based on the current location of an delivery resource from location database 202 and the geofence defining the docking station contained in geofence database 205.

In some embodiments, the docking station can determine a docking plan for docking various item delivery as they arrived. In some embodiments, the docking station can determine this plan based upon the expected arrival time of various item delivery as calculated by the location database 202 and the available docking stations at an item delivery facility. In some embodiments, the docking database can then send docking instructions to various item delivers via mobile device 100 to instruct them where to dock according to the plan.

System hub 201 is also in communication with staffing database 207. In some embodiments, the staffing database 207 may comprise a processor, memory, databases, address and control lines, and other components similar to those described herein for the system hub 201. In other embodiments, the staffing database 207 may be configured to use the processor, memory, databases, address and control lines, and other components of system hub 201, or a combination of its own components and the system hub 201's components.

Staffing database 207 can contain information on the staffing levels of various item delivery facilities. In some embodiments, staffing database 207 can also determine if more staffing is needed at particular times based on the expected arrival of item delivery. In some embodiments, the staffing database 207 can develop a staffing plan based on the amount of vehicles or items that are expected to arrive at a particular item facility as based on the expected arrival time of various vehicles determine by location database 202.

System hub 201 is also in communication with communication module 208. In some embodiments, the communication module 208 may comprise a processor, memory, databases, address and control lines, and other components similar to those described herein for the system hub 201. In other embodiments, the communication module 208 may be configured to use the processor, memory, databases, address and control lines, and other components of system hub 201, or a combination of its own components and the system hub 201's components.

Communication module 208 is responsible for communications between the mobile device 100 and other devices via wired and/or wireless communication. In some embodiments, the communication module 208 communicates via telephone, cable, fiber-optic, or any other wired communication network. In some embodiments, the communication module 108 may communicate via cellular networks, WLAN networks, or any other wireless network. In some embodiments, the communication module 208 can be used to communicate any of the data collected by central server 200 or any data that needs to be transmitted to central server 200. In some embodiments, the communication module 208 can transmit all the information to and from the mobile devices 100.

In some embodiments, communication module 108 can be configured to send alerts to various mobile device 100s. In some embodiments, these alerts can contain information such as that the delivery resource needs to unload the vehicle, or the delivery resource needs to dock or redock a vehicle at a particular docking stations. In some embodiments, the communication module 108 can also be used to send request for additional staffing at a particular item delivery facility.

Figure 3:
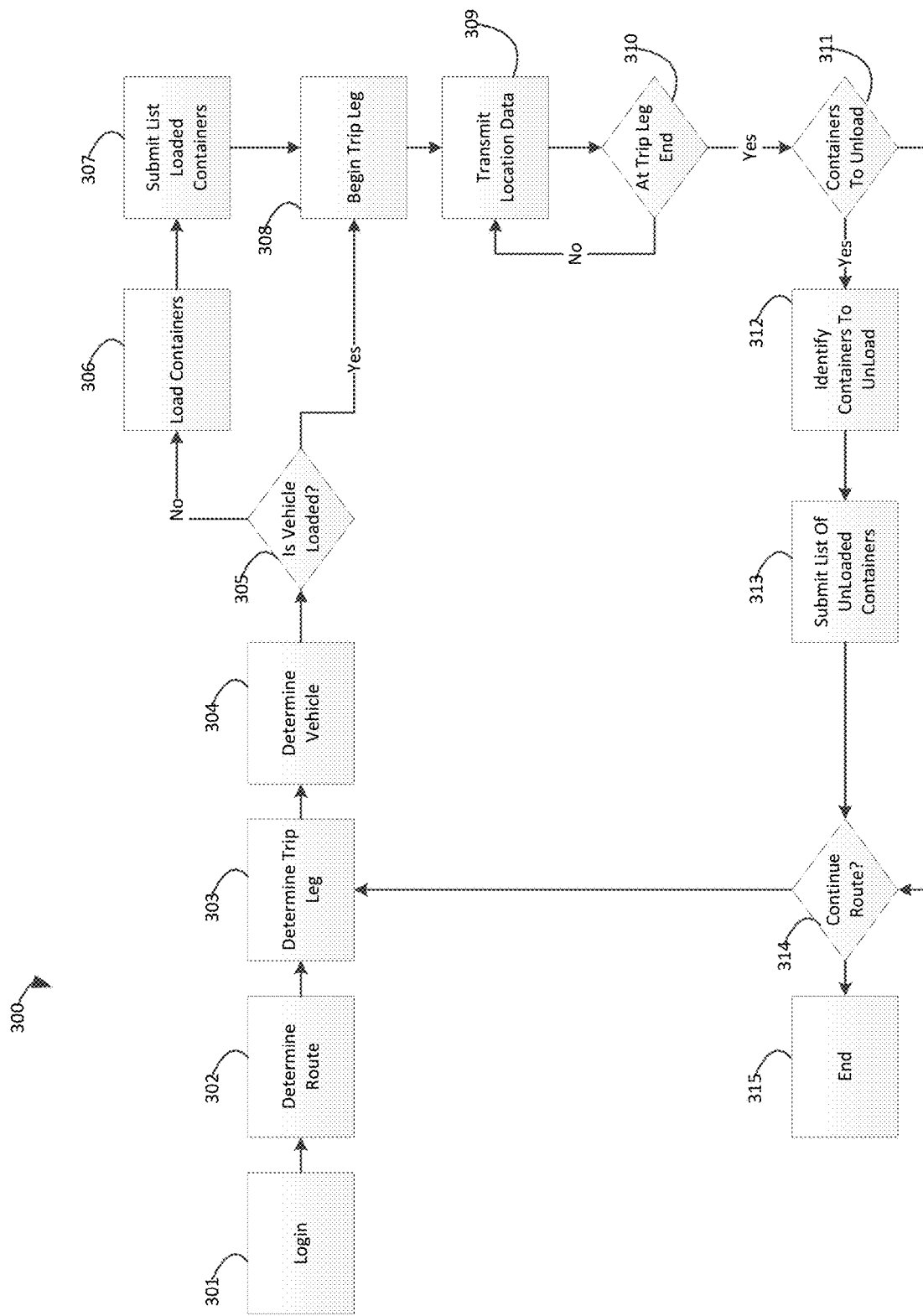
FIG. 3 is a flow chart depicting one embodiment of a process for operating the mobile device to track item delivery.

FIG. 3 is a flow chart depicting one embodiment of a process using the mobile device 100. The process 300 starts in the process block 301. In process block 301, the delivery resource logs into the mobile device 100 using user authorization module 103. In some embodiments, the delivery resource can log in by scanning a badge with scanning module 102 and receive a unique identifier from scanning the badge to log in to the system using user authorization module 103. In some embodiments, the user could also log in by inputting a unique user ID and password into the mobile device using user interface 105.

The process moves to process block 302. In process block 302, the delivery resource using the mobile device 100 determines the route he or she will be traveling on using route module 106. In some embodiments, he can select a route by inputting a unique identifier for a route into the mobile device 100 that is recognized by mobile device 100. In some embodiments, the delivery resource can use the route database to search for a route in the manner previously described.

The process moves to process block 303. In process block 303, the user selects the current trip leg from among the possible trip legs associated with the selected route as stored in route module 106.

The process moves to process block 304. In process block 304, the user designates the vehicle he or she will be driving by scanning the vehicle, scanning a code on the vehicle, receiving a RF signal, such as a Bluetooth signal, with scanning module 102 and storing the unique identifier in cargo module 107. By scanning the vehicle the delivery resource will be using, the mobile device 100 and the central system 200 can store an association between the mobile device 100, the delivery resource, and the items on or in the vehicle.

The process moves to decision block 305. In decision block 305, the mobile device 100 determines whether the vehicle is loaded. In some embodiments, the mobile device 100 can determine whether the vehicle is loaded by having the user select a load button or similar input using user interface 105. In some embodiments, the cargo module 106 can display all of the loaded items and item containers to the user to assist in his or her decision. In some embodiments, the mobile device 100 can also determine if the vehicle needs to be loaded via cargo module 106, which may already contain information about what is loaded into the trailer from prior scans or from a separate system. In some embodiments, the mobile device 100 may receive particular instructions on which items to load.

If the vehicle is not loaded, the process moves to process block 306. Otherwise the process moves to process block 308. In process block 306, the mobile device 100 identifies the containers or items to load on the vehicle. In some embodiments, the list of items to load may be generated by another component of the system and communicated to the mobile device. In some embodiments, the items to be loaded may be staged in a dock area near the vehicle. To load items on the vehicle, the mobile device 100 scans the items before or during loading with the scanning module 102. The mobile device 100 that is used to scan the items may be the mobile device 100 assigned to the deliver resource, or may be assigned to facility personnel. In some embodiments, to load the vehicle, an item may be scanned, and then a unique identifier or computer readable code on the vehicle can be scanned by the mobile device 100. This scanning can associate the item with the vehicle, and can store a manifest of the items on the vehicle. The unique identifiers from the items are stored and associated with the vehicle. The system hub 101 or central server 200 can generate a manifest using the scanned identifiers and the item information associated with the item identifiers. The manifest can be stored in the cargo module 107. When the vehicle is loaded, the delivery resource can take custody of the vehicle, and, by association, all the items on the vehicle, by scanning the vehicle identifier with the delivery resource's mobile device 100.

The process moves to process block 307. In process block 307, the manifest of loaded items and item containers is submitted to cargo database 204 from cargo module 106. In some embodiments, the user can initiate this process by selecting a submit button or other similar input on user interface 105 once the vehicle is loaded.

The process moves to process block 308. In process block 308, the delivery resource begins the selected trip leg. In some embodiments, the delivery resource can inform the system that the trip leg has begun by selecting a button or similar input on user interface 105. In some embodiments, the mobile device 100 can automatically determine that the trip leg has begun based on changes in location recorded by GPS module 104.

The process moves the process block 309. In process block 309, the GPS module 104 periodically transmits location data to location database 202. The GPS module 104 can be a GPS receiver located in a vehicle, separate from the mobile device 100. In some embodiments, the GPS module in the mobile device 100 and the vehicle's GPS system can both record, store, and transmit the location data. The location data can be used for analytics, driver training, evaluating compliance, and for billing or payment purposes.

The process moves to decision block 310. In process block 310, the delivery resource ends the selected trip leg. In some embodiments, the delivery resource can inform the system that the trip leg has ended by selecting a button or similar input on user interface 105. In some embodiments, the mobile device 100 can automatically determine that the trip leg has ended by receiving a notification from central server 200, which determines that the vehicle has arrived at the correct location based on geofence database 205.

If the trip has not ended, the process returns to process block 309. Otherwise the process moves to decision block 311. In decision block 311, the mobile device determines whether the vehicle needs to be unloaded. In some embodiments, the mobile device can determine whether the vehicle needs to be unloaded by having the user select an unload button or similar input using user interface 105. In some embodiments, the cargo module 106 can display all of the loaded items and item containers as well as their destinations to the user to assist in his or her decision. In some embodiments, the central server 200 can transmit an alert to the user containing the items that need to be unloaded based on the location of the vehicle as determined by geofence database 205 and the destinations of the items recorded in cargo database 204 and cargo module 106.

If the vehicle needs to be unloaded, the process moves to process block 312. In process block 312, the mobile device 100 identifies the containers or items to unload by scanning them with scanning module 102. This will remove the scanned items from the manifest in cargo module 106. For example, at a particular destination, such as a particular facility, the delivery resource may deliver all of the items on a vehicle, part of the items on the vehicle, pick up more items and load the additional items on the vehicle, or both unload and load, either some or all of the items. The manifest in the cargo module 106 can send information, or cause the system hub 101 to alert the delivery resource as to which items are to be unloaded. The delivery resource or other personnel at the distribution facility can unload the items. As the items are unloaded, or as additional items are unloaded, the item identifiers are scanned. If an item is to be unloaded, the scan can remove the item from the vehicle manifest. If the item is to be newly loaded, the scan can add the item to the manifest in the cargo module 106.

If the vehicle does not need to be unloaded, such as where the delivery resource is stopping over or handing off to another delivery resource, the process moves directly to decision block 314. Where the long-haul route requires more than one driver, the first delivery resource can complete a hand-off with a second delivery resource. The first driver, who is handing off the load to the second driver, can select a relay or drop-off option on the mobile device 100. The first driver may scan a facility code or the vehicle identifier as well. The second driver can log in to his or her mobile device 100 and select a pickup or begin route, or can simply scan the vehicle identifier on the vehicle the second driver will be taking to the next distribution facility.

In some embodiments, the items need not be scanned with the same mobile device 100. For example, the items being unloaded from the vehicle may be scanned by mobile devices 100 operated by dock personnel, or may be automatic scans based on RFID tags, Bluetooth beacons, and the like. The mobile devices 100 used for unload scans, or the automatic signals can be sent from the mobile devices 100 to the system hub 201, which, in turn, can update the manifests stored in the cargo manifest by transmitting information to the mobile device 100 used by the delivery resource. The unload scans can also be performed with the delivery resource's mobile device 100.

The process moves to process block 313. In process block 313, the cargo module submits the revised manifest to cargo database 204. In some embodiments, the user can initiate this process be selecting a submit button or other similar input on user interface 105.

The process moves to decision block 314. In decision block 314, the user determines whether to continue the route. If the user wishes to continue, the process moves to process block 303 where the user selects a new trip leg. Otherwise the process ends.

Figure 4:
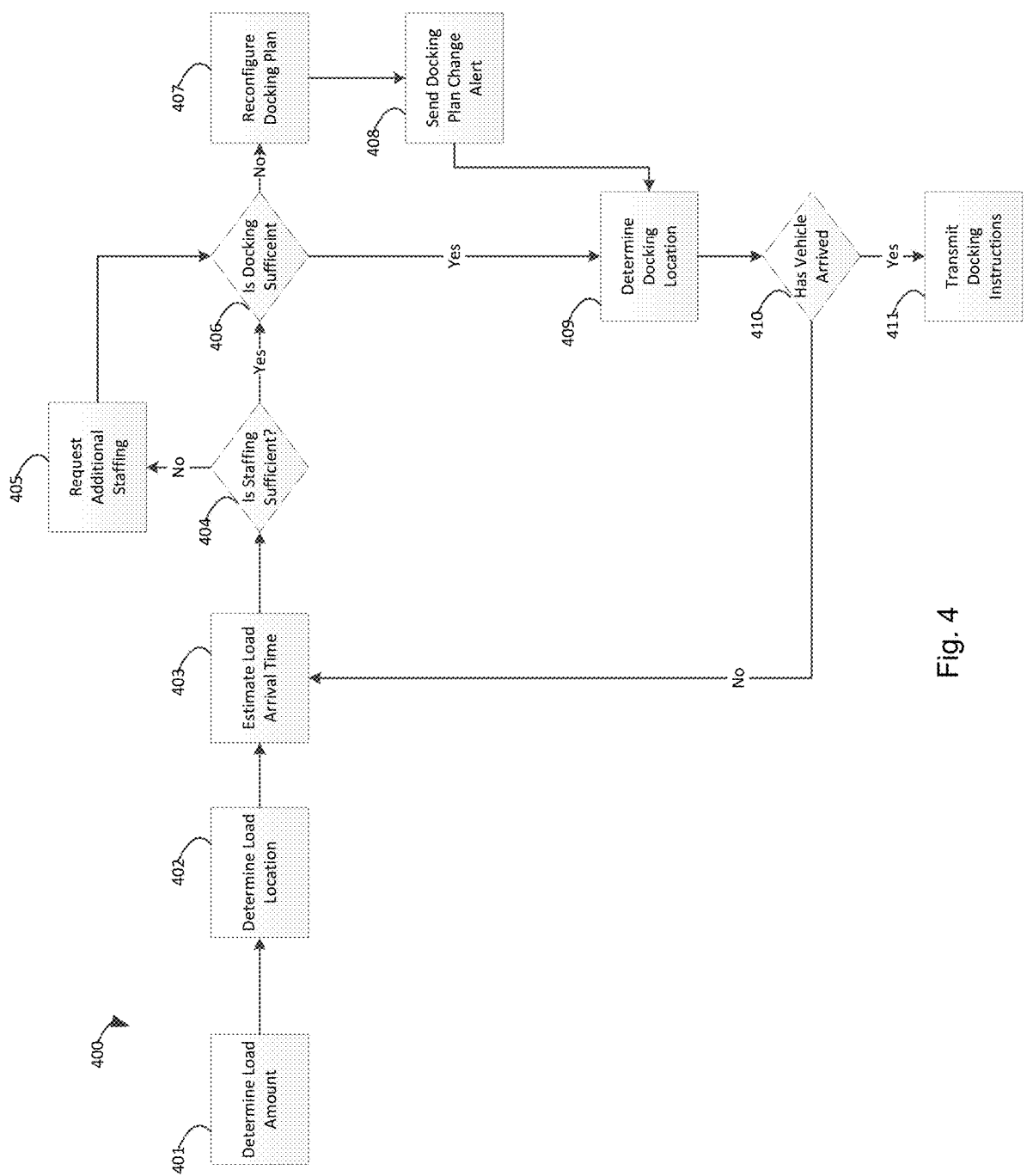
FIG. 4 is a flow chart depicting one embodiment of a process for using the system for tracking item delivery.

FIG. 4 is a flow chart depicting one embodiment of a process 400 using the central server 200 in conjunction with mobile device 100. The process begins in process block 401. In process block 401, central server 200 uses cargo database 204 and the contained cargo manifests to determine the expected load of items and item containers that will be arriving and which vehicles they will be on for a particular mail delivery facility.

The process moves to process block 402. In process block 402, the central server 200 uses location database 202 to determine the location of all of the vehicles that will be delivering items to a particular distribution facility.

The process moves to process block 403. In process block 403, the central server 200 uses the location database 202 to determine the expected arrival time of various vehicles that will be delivering items to a particular item delivery facility. In some embodiments, the location database can estimate the expected delivery time based on the current location and speed of the various vehicles. In some embodiments, the location database 202 can also determine an arrival time based on the route that was selected by a user of a mobile device of a particular vehicle stored in route database 203. For example, if the route that the vehicle is traveling on is 100 miles long, and the vehicles location shows that it is traveling a 50 miles per hour at a location 50 miles away from the end of the route, the location database 202 can determine that the expected arrival time is 1 hour from the current time.

The process moves to decision block 404. In decision block 404, the central server 200 uses staffing database 207 to determine if there will be sufficient staffing to handle the quantities of items based on the expected arrival of items and vehicles. In some embodiments, the staffing database 207 can use historical records to determine the amount of staffing needed. If there is sufficient staffing, the process moves to decision block 406. Otherwise, the process moves to process block 405

In process block 405, the central server 200 can use communications module 208 to request additional staffing if necessary.

The process moves to decision block 406. In decision block 406, the central server 200 uses docking database 206 to determine if there is sufficient docking for the arriving vehicles based on their expected arrival times. In some embodiments, the docking database 206 makes this determination based on the currently docked vehicles and additional available docking database. For example, if a 16 foot trailer is arriving, and the only 16 foot loading dock is unavailable, the docking database can determine that there is insufficient docking available.

If docking is not sufficient, the process moves to process block 407, otherwise the process moves to process block 409. In process block 407, the docking database 206 reconfigures the docking plan to accommodate vehicles that will be arriving. For example, if 53 foot trailer is arriving and a 12 foot trailer is currently docked in the only dock that can accommodate the 53 foot trailer, the docking database 206 can determine that the 12 foot trailer needs to be moved to a new location.

The process moves to process block 408. In process block 408, central server 200 sends a docking plan alert to the mobile device 100 of any vehicles that need to be move using communication module 108 that instructs the delivery resource where to move to.

The process moves to process block 409. In process block 409 docking database 206 determines where the newly arriving vehicles will be docking based on the docking plan.

The process moves to decision block 410. In decision block 410, the central server 200 uses the geofence database 205 to determine if a particular vehicle has arrived or determine when the vehicle will be arriving at a particular item delivery center by determining if that vehicle's location has entered into the geofence associated with the mail delivery center. The central server 200 can store a time associated with geofence events. For example, the central server 200 can store a facility departure event when the mobile device 100 leaves the geofence surrounding a facility. The central server can store a time when the vehicle or mobile device 100 enters a geofence around a distribution facility. If the vehicle has arrived, the process moves to process block 411. Otherwise it returns to process block 403.

The central server can also initiate a start-the-clock measurement when the mobile device 100 leaves the geofence around a distribution facility and a stop-the-clock event when the mobile device 100 enters the geofence around the destination facility. This information can be used to improve processes, such as increased measurement of certain classes of items, such as first-class mail.

In process block 411, central server 200 uses communication module 108 to transmit docking instructions according to the docking plan to mobile device 100 associated with the vehicle that just arrived.

Figure 5A:
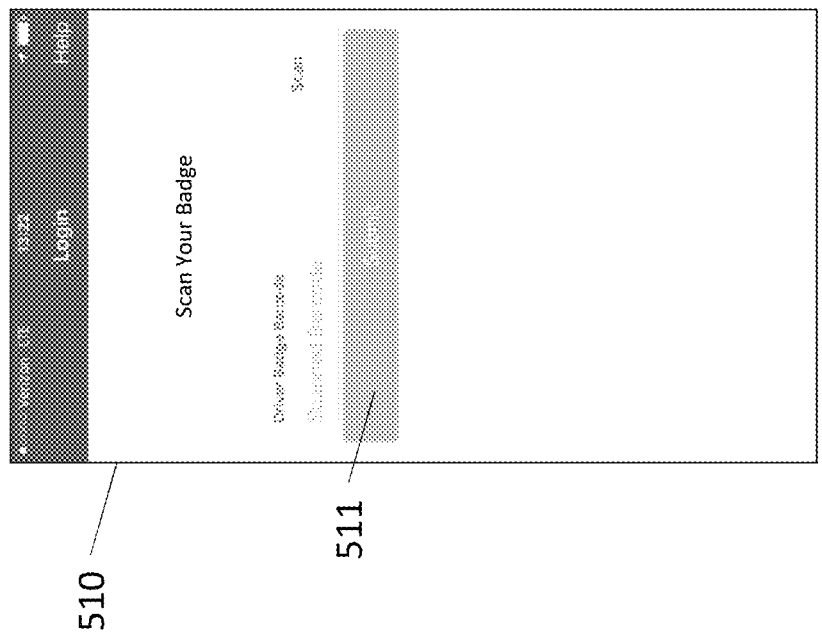
FIGS. 5*a-e* show one embodiment of an application for a mobile device that can track a mobile device for item delivery.

FIGS. 5a-e show one embodiment of an application for a mobile device that can assist in tracking the progress of an delivery resource. FIG. 5a displays an application screen 510. In application screen 510, a user scans their badge to allow the user to log into the application. Once all of the user's information has been entered, users can click on the submit button 511 to log in.

Figure 5B:
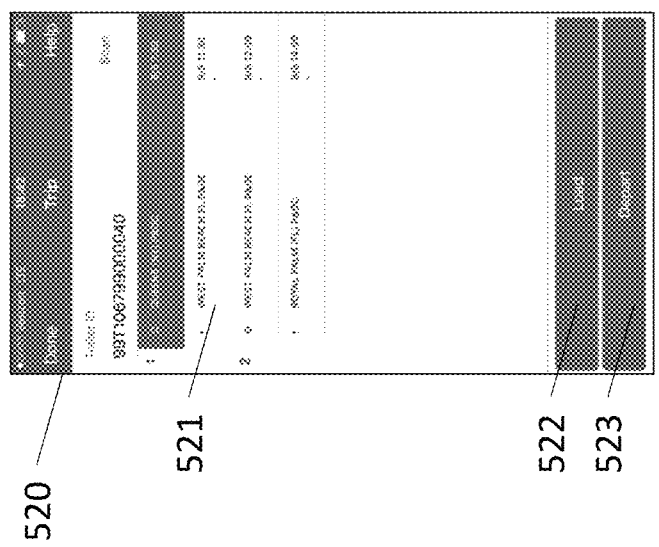
Figure 5C:
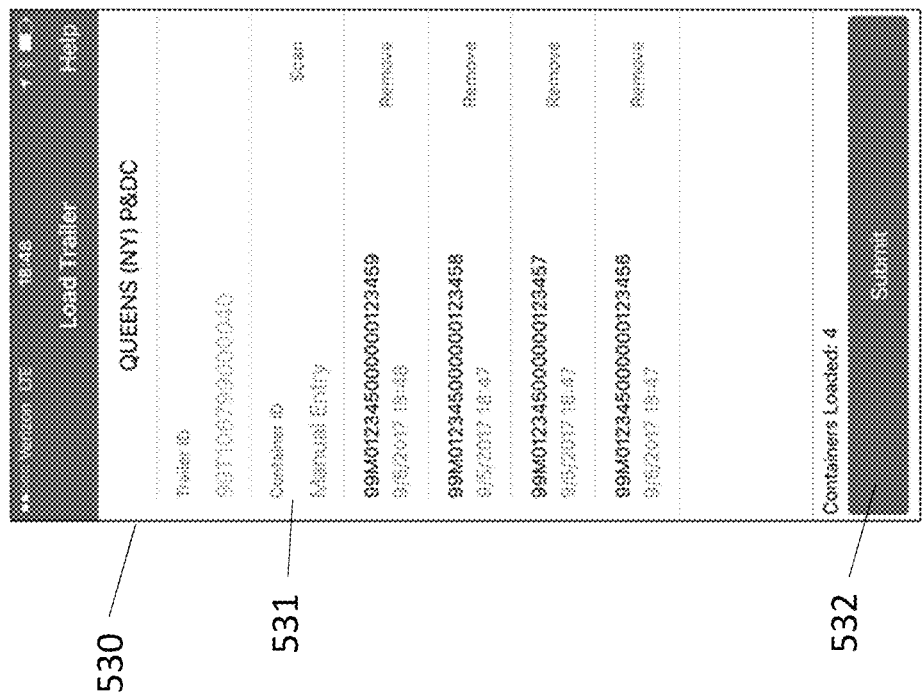

FIG. 5b displays an application screen 520 that allows a user to scan or enter a trailer identifier or container identifier. In some embodiments, the user can click on the scan button and then use the mobile device 100 to scan a trailer. To manually enter a trailer identifier, the user can click into the trailer ID section and type the value. If the trailer ID is not properly formatted, an error message will display. The user can also search for and select routes from this screen, such as route 521, called WEST PALM BEACH FL B&DC. Further from this screen, the user can select load button 522 to begin loading items into the trailer and depart button 523 to notify the application that the user is departing FIG. 5c displays an application screen 530. Application screen 530 allows a user to scan or manually enter item container IDs into field 531 to designate that those item containers are being loaded. The user can then submit the list of items being loaded via submit button 532.

Figure 5D:
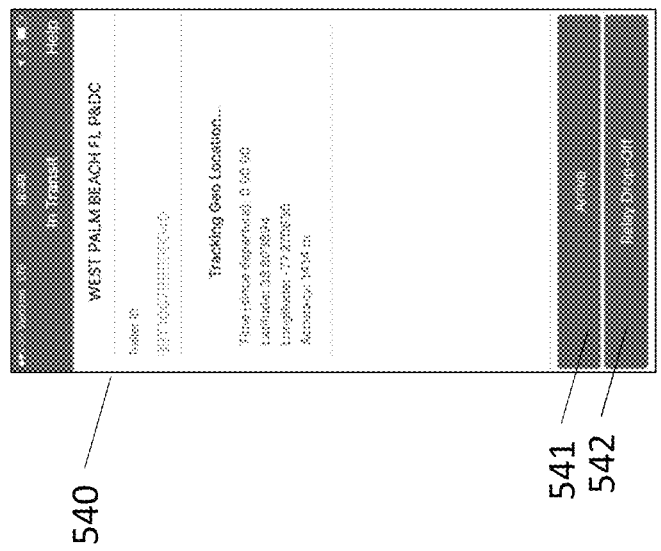
Figure 5E:
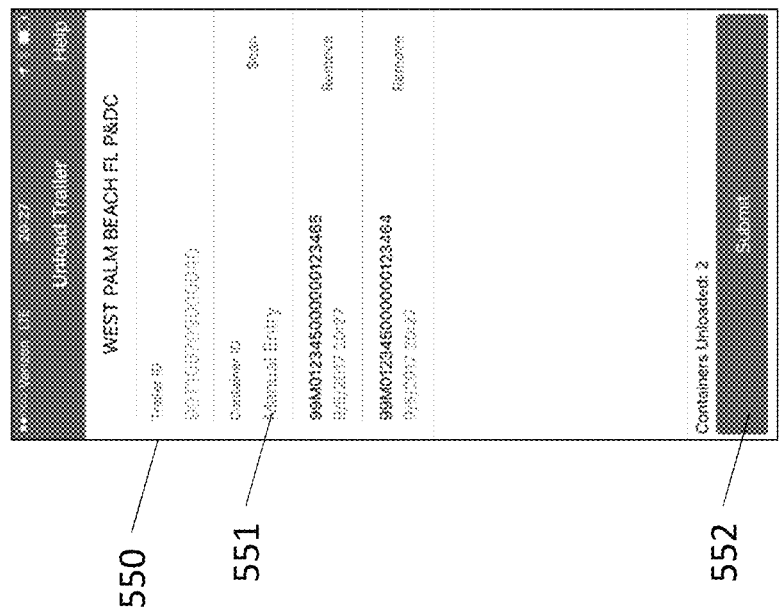

FIG. 5d displays an application screen 540. Application screen 540 displays one embodiment of a potential screen that can be displayed to the user once the user has loaded the trailer and begun driving. The application can display the current location and the travel time of the user. Once the user arrives at a destination, they can select the arrive button 541 that designates that the route has finished, or the relay drop off button 542 that designates that a separate driver will begin driving the vehicle FIG. 5e displays an application screen 550. Application screen 550 allows a user to scan or manually enter item container IDs into field 551 to designate that those item containers are being unloaded. The user can then submit the list of items being unloaded via submit button 552.

Additional disclosure can be found in the appendix attached hereto. Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for loading and unloading vehicles, the system comprising:
   a location database configured to receive location data associated with at least one vehicle or vehicle trailer;
   a cargo database storing a cargo manifest for items on the at least one vehicle or vehicle trailer and associating the cargo manifest with the at least one vehicle or vehicle trailer;
   a geofence database storing a first geofence around a first distribution facility in a distribution network, a second geofence around a second distribution facility in the distribution network, and a plurality of docking station geofences each corresponding to one of a plurality of docking stations at the second distribution facility in the distribution network;
   a docking database configured to:
      develop and store a docking plan for utilization of the plurality of docking stations at the second distribution facility in the distribution network; and
   one or more processors configured to:
      detect the exit of the at least one vehicle or vehicle trailer from the first geofence around the first distribution facility;
      identify at least one dock size requirement for the at least one vehicle or vehicle trailer from the cargo database;
      determine the expected entry time of the at least one vehicle or vehicle trailer into the second geofence around the second distribution facility based on the detected exit from the first geofence around the first distribution facility and the location data associated with the at least one vehicle or vehicle trailer;
      determine, based on the presence of vehicles or trailers within the plurality of docking station geofences, that a dock meeting the dock size requirement is not available at the expected entry time of the at least one vehicle or vehicle trailer;
      in response to determining that a dock meeting the dock size requirement is not available, update a docking station assignment for at least one of the plurality of docking stations at the second facility based on the dock size requirement and the determined expected entry time of the at least one vehicle or vehicle trailer into the second geofence around the second distribution facility, wherein updating the docking station assignment comprises causing at least one other vehicle or trailer having a different dock size requirement to be moved to a different location at the second distribution facility;
      transmit the updated docking station assignment to a mobile computing device associated with the at least one vehicle or vehicle trailer;
      determine, based on the cargo manifest for the items, which items are to be unloaded from the vehicle or vehicle trailer by identifying a subset of the items to be unloaded at the second distribution facility and one or more of a plurality of automated delivery resources needed to unload the items;
      cause the one or more of the plurality of automated delivery resources to travel to the at least one of the plurality of docking stations;
      cause the one or more of the plurality of automated delivery resources to unload the subset of items at the second facility;
      cause the automatic scanning of the subset of items; and
      update the cargo manifest based on the automatic scanning.

2. The system of claim 1, further comprising a route database configured to store a route associated with the at least one vehicle or vehicle trailer.

3. The system of claim 1, wherein the processor is further configured to detect the entry of the at least one vehicle or vehicle trailer into the second geofence around the second distribution facility, and wherein the processor is configured to cause the one or more of the plurality of automated delivery resources to travel to the assigned dock based on the detected entry of the at least one vehicle or vehicle trailer into the second geofence around the second distribution facility.

4. The system of claim 1 wherein the docking database is configured to:
   reconfigure the docking plan based at least in part on the position of at least one vehicle or vehicle trailer within an item delivery facility and the dock size requirement of the vehicle or vehicle trailer;

identify if a second vehicle or vehicle trailer is assigned to the updated dock at the expected entry time; and assign an alternate dock to the second vehicle or vehicle trailer at the second distribution facility.

5. The system of claim 1 further comprising a staffing database configured to determine a staffing plan based at least in part on the location data of the at least one vehicle or vehicle trailer.

6. The system of claim 1 wherein the location database is configured to receive the location data from a mobile device.

7. The system of claim 1, wherein the cargo manifest is generated by a mobile device based at least on scan information associated with the items on the vehicle or vehicle trailer.

8. A method comprising:

receiving location data associated with at least one vehicle or vehicle trailer;

receiving a cargo manifest for items on the at least one vehicle or vehicle trailer;

storing, in a geofence database, a first geofence around a first distribution facility in a distribution network, a second geofence around a second distribution facility in the distribution network, and a plurality of docking station geofences each corresponding to one of a plurality of docking stations at the second distribution facility in the distribution network;

developing a docking plan for the plurality of docking stations at the second distribution facility in the distribution network;

detecting the exit of the at least one vehicle or vehicle trailer from the first geofence around the first distribution facility;

identifying a dock size requirement for the at least one vehicle or vehicle trailer;

determining the expected entry time of the at least one vehicle or vehicle trailer into the second geofence around the second distribution facility based on the detected exit from the first geofence around the first distribution facility and the location data of the at least one vehicle or vehicle trailer;

determining, based on the presence of vehicles or trailers within the plurality of docking station geofences, that a dock meeting the dock size requirement is not available at the expected entry time of the at least one vehicle or vehicle trailer;

in response to determining that a dock meeting the dock size requirement is not available, updating a docking station assignment for at least one of the plurality of docking stations at the second facility based on the dock size requirement and the determined expected entry time of the at least one vehicle or vehicle trailer into the second geofence, wherein updating the docking station assignment comprises causing at least one other vehicle or trailer having a different dock size requirement to be moved to a different location at the second distribution facility;

transmitting the updated docking assignment for the at least one of the plurality of docking stations at the second facility to a mobile computing device associated with the at least one vehicle or vehicle trailer determining, based on the cargo manifest for the items, which items are to be unloaded from the vehicle or vehicle trailer by identifying a subset of the items to be unloaded at the second distribution facility and one or more of a plurality of automated delivery resources needed to unload the items;

causing the one or more of the plurality of automated delivery resources to travel to the at least one of the plurality of docking stations;

automatically unloading the subset of items at the second facility the one or more of the plurality of automated delivery resources;

automatically scanning of the subset of items; and updating the cargo manifest based on the scanning of the subset of items.

9. The method of claim 8 further comprising storing a route associated with the at least one vehicle or vehicle trailer.

10. The method of claim 8 further comprising:

detecting the entry of the at least one vehicle or vehicle trailer into the second geofence of the second distribution facility; and wherein causing the one or more of the plurality of automated delivery resources to travel to the assigned dock is based on detecting the entry of the at least one vehicle into the second geofence of the second distribution facility.

11. The method of claim 8 further comprising identifying the position of the at least on vehicle or vehicle trailer within the one of the plurality of item delivery facilities based at least in part on the location data.

12. The method of claim 11 further comprising:

reconfiguring the docking plan based at least in part on the position of the at least one vehicle or vehicle trailer within the one of the plurality of item delivery facilities and the dock size requirement;

identifying that a second vehicle or vehicle trailer is assigned to the updated dock at the expected entry time; and assigning an alternate dock to the second vehicle or vehicle trailer at the second distribution facility.

13. The method of claim 8 further comprising determining a staffing plan based at least in part on the location data of the at least one vehicle or vehicle trailer.

14. The method of claim 8 further comprising receiving the location data from a mobile device.

15. The method of claim 8, wherein the cargo manifest is generated by a mobile device based at least on scan information associated with the items on the vehicle or vehicle trailer.

* * * * *